United States Patent [19]
Takada et al.

[11] Patent Number: 5,240,284
[45] Date of Patent: Aug. 31, 1993

[54] STEERING COLUMN ASSEMBLY WITH HORIZONTAL POSITION ADJUSTMENT MECHANISM

[75] Inventors: Yoshiharu Takada; Satoshi Kinoshita, both of Shizuoka, Japan

[73] Assignee: Fuji Kiko Company, Limited, Tokyo, Japan

[21] Appl. No.: 725,218

[22] Filed: Jun. 26, 1991

Related U.S. Application Data

[63] Continuation of Ser. No. 534,834, Jun. 7, 1990, abandoned.

[30] Foreign Application Priority Data

Jun. 7, 1989 [JP] Japan .................................. 1-144554

[51] Int. Cl.$^5$ ............................................. B62D 1/18
[52] U.S. Cl. ...................................... 280/775; 74/493
[58] Field of Search ................ 280/775; 74/493, 89.15

[56] References Cited

U.S. PATENT DOCUMENTS

| | | | |
|---|---|---|---|
| 1,548,411 | 8/1925 | Derr | 74/493 |
| 2,888,836 | 6/1959 | Felts | 74/493 |
| 3,533,302 | 10/1970 | Hansen | 280/775 |
| 3,580,101 | 5/1971 | Jorgensen et al. | |
| 3,678,778 | 7/1972 | Groves | 74/493 |
| 3,803,939 | 4/1974 | Schenton | 74/493 |
| 3,978,740 | 9/1976 | Selzer | 74/493 |
| 4,691,587 | 9/1987 | Farrand et al. | |

FOREIGN PATENT DOCUMENTS

| | | | |
|---|---|---|---|
| 0121506 | 10/1984 | European Pat. Off. | |
| 3423161 | 1/1985 | Fed. Rep. of Germany | |
| 3328283 | 2/1985 | Fed. Rep. of Germany | 74/493 |
| 3732817 | 4/1988 | Fed. Rep. of Germany | |
| 2257483 | 8/1975 | France | 74/493 |
| 61-67663 | 4/1986 | Japan | 74/493 |
| 804830 | 11/1958 | United Kingdom | |

Primary Examiner—Karin L. Tyson
Attorney, Agent, or Firm—Bachman & LaPointe

[57] ABSTRACT

A steering column assembly for a vehicle includes a steering column, a stationary bracket and a guide member which allows the steering column to displace horizontally in a direction along a longitudinal axis of the vehicle. A pair of universal joints with a shaft connecting them are provided forward of the steering column for allowing variation in angle between the steering column and the shaft, the angular variation being caused by the horizontal displacement of the steering column. The shaft includes an outer sleeve and an inner shaft telescopically received in the outer sleeve. The outer sleeve and the inner shaft are connected in such a fashion as to allow the inner shaft to displace along an axis of the outer sleeve in response to the horizontal displacement of the steering column.

16 Claims, 6 Drawing Sheets

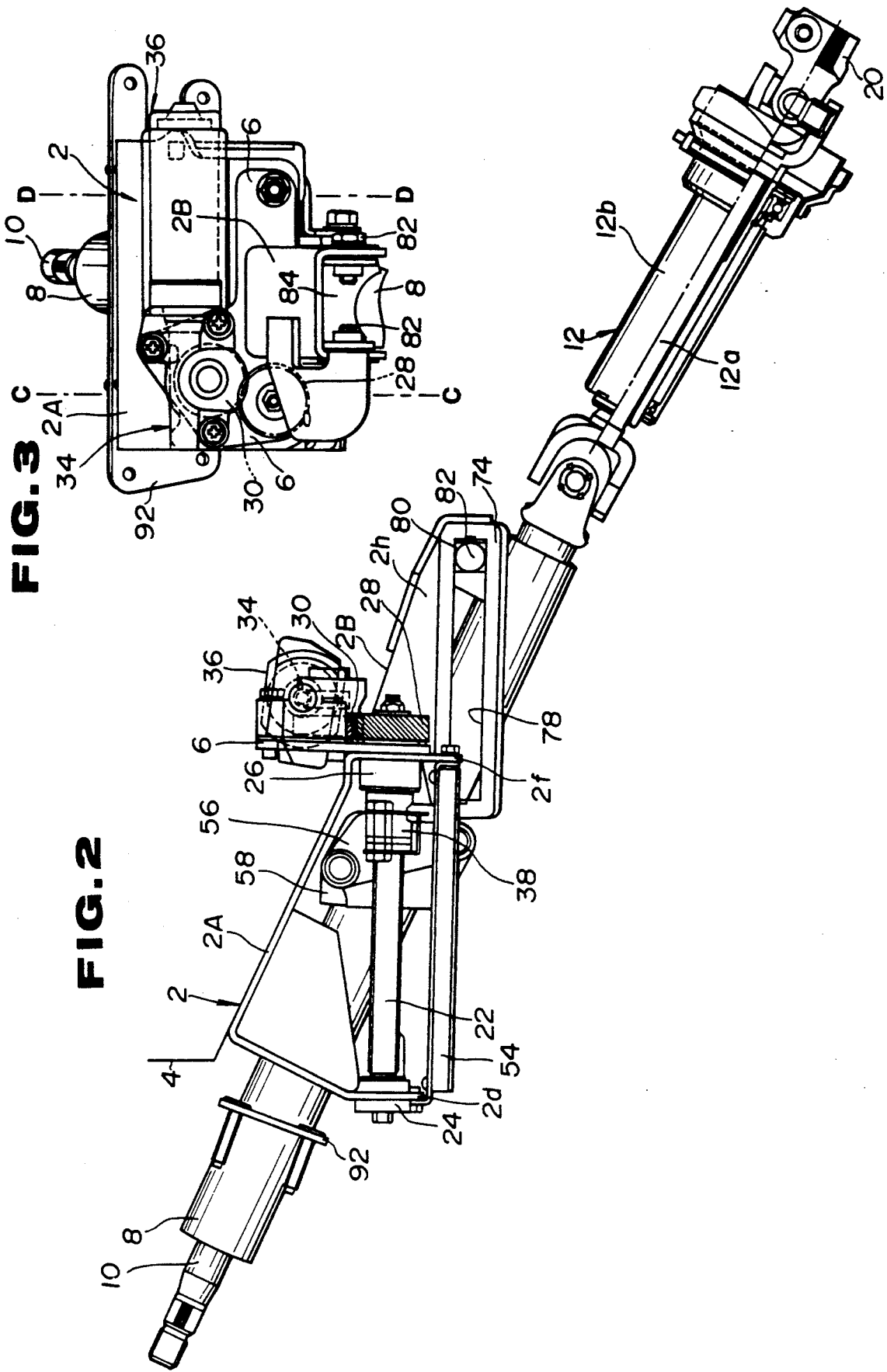

STEERING COLUMN ASSEMBLY WITH HORIZONTAL POSITION ADJUSTMENT MECHANISM

This is a continuation of co-pending U.S. application Ser. No. 534,834 filed on Jun. 7, 1990 now abandoned.

BACKGROUND OF THE INVENTION

1. Field of the Invention

The present invention relates generally to a vehicular steering column assembly having a horizontal position adjustment mechanism for a steering column. More specifically, the present invention relates to a vehicular steering column assembly that allows a positional adjustment of a steering column in a horizontal direction along a longitudinal axis of the vehicle.

2. Description of the Background Art

In one type of a vehicular steering column assembly, a tilt-angle of a steering column, i.e. a steering wheel can be adjusted to ensure a driver's optimum posture for driving the vehicle.

Similarly, in another type of a vehicular steering column assembly, a steering shaft is telescopically received in a steering column to be allowed an axial displacement relative to the steering column so as to provide a positional adjustment of a steering wheel in a direction along the axis of the steering column.

In still another type of a vehicular steering column assembly, the tilt-angle adjustment of the steering wheel as well as the axial adjustment of the steering wheel as noted above are combined.

All of the above-noted positional adjustments of the steering wheel can be performed manually or electrically.

However, in the tilt-angle adjustment of the steering wheel, since an angle of the steering wheel is changed relative to the driver, an angular adjustment range of the steering wheel can not be set large. Similarly, in the axial adjustment of the steering wheel, since a vertical level of the steering wheel is inevitably changed, an adjustment range along the axis of the steering column can not be set large as in the tilt-angle adjustment of the steering wheel.

Accordingly, in general, a seat position adjustment along the longitudinal axis of the vehicle should be required in addition to the tilt-angle adjustment and/or the axial adjustment of the steering wheel, which is somewhat complicated. Further, when the seat position is changed, the visual field of the driver is inevitably changed to adversely affect the driver's operation of the vehicle.

SUMMARY OF THE INVENTION

Therefore, it is an object of the present invention to provide a steering column assembly that can eliminate the above-noted defects inherent in the background art.

It is another object of the present invention to provide a steering column assembly having a horizontal position adjustment mechanism, wherein a position of a steering wheel can be optimumly adjusted without a positional adjustment of a driver's seat.

It is a further object of the present invention to provide a steering column assembly, wherein a position of a steering wheel can be adjusted horizontally in a direction along a longitudinal axis of a vehicle without changing a tilt angle and a vertical level of the steering wheel.

To accomplish the above-noted and other objects, according to one aspect of the present invention, a steering column assembly for a vehicle, the vehicle having a longitudinal axis extending between forward and rearward ends of the vehicle, comprises:

a steering column;

stationary bracket means fixed to a vehicle body;

first means, provided between the steering column and the satisfactory bracket means, for supporting the steering column relative to the stationary bracket means;

the first means adapted to allow the steering column to displace horizontally in a direction along the longitudinal axis;

joint means, provided forward of the steering column, for allowing relative angular variation of the steering column, the relative angular variation caused by the horizontal displacement of the steering column;

second means associated with the steering column, the second means adapted to extend when the steering column displaces horizontally rearward and to contract when the steering column displaces horizontally forward.

According to another aspect of the present invention, a steering column assembly for a vehicle, the vehicle having a longitudinal axis extending between forward and rearward ends of the vehicle, includes:

joint means, provided forward of the steering column, for allowing variation of an angle between the steering column and an associated member, the angle variation caused by the horizontal displacement of the steering column; and second means, associated with the steering column, for allowing variation of a distance between the steering column and an associated member, the distance variation caused by the horizontal displacement of the steering column. According to still another aspect of the present invention, a steering column assembly for a vehicle, the vehicle having a longitudinal axis extending between forward and rearward ends of the vehicle, includes:

a first joint, provided forward of the steering column, for allowing pivotable movement of the steering column;

a second joint provided forward of the first joint, shaft means connecting the first and second joints for pivotable movement therebetween; and the shaft means adapted to extend when the steering column moves horizontally rearward and to contract when the steering column moves horizontally forward.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 2 is a left side view showing the steering column assembly illustrated in FIG. 1;

FIG. 3 is a partial front view showing the steering column assembly illustrated in FIGS. 1 and 2;

FIG. 8 (B) is a plan view showing the stationary bracket illustrated in FIG. 1;

FIG. 8 (C) is a front view showing the stationary bracket illustrated in FIG. 1.

DESCRIPTION OF THE PREFERRED EMBODIMENT

Now, a steering column assembly according to a preferred embodiment of the present invention will be described hereinbelow with reference to FIGS. 1 to 9.

Figure 1:
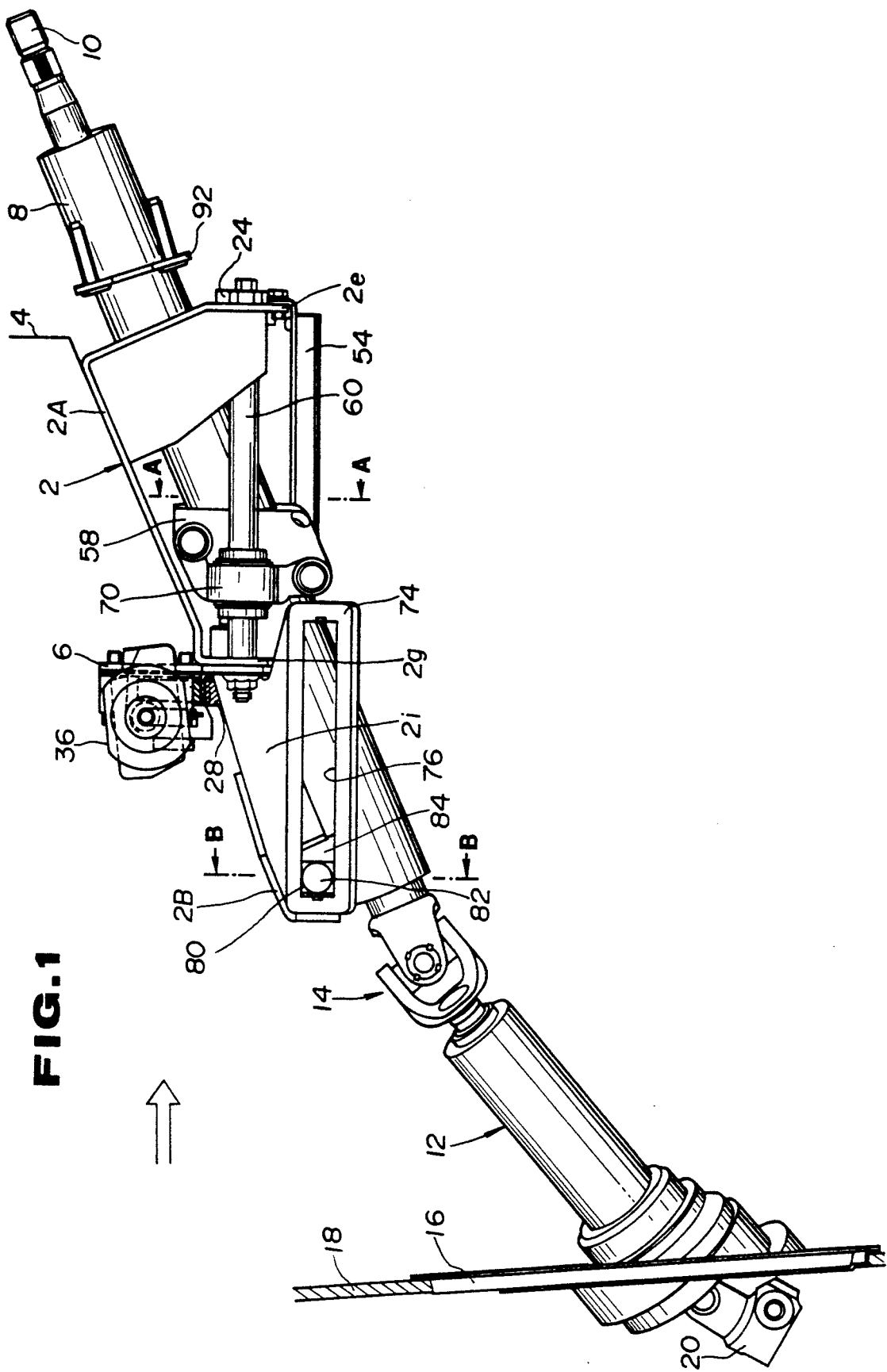
FIG. 1 is a right side view showing a steering column assembly provided with a horizontal position adjustment mechanism according to a preferred embodiment of the present invention.
Figure 8A:
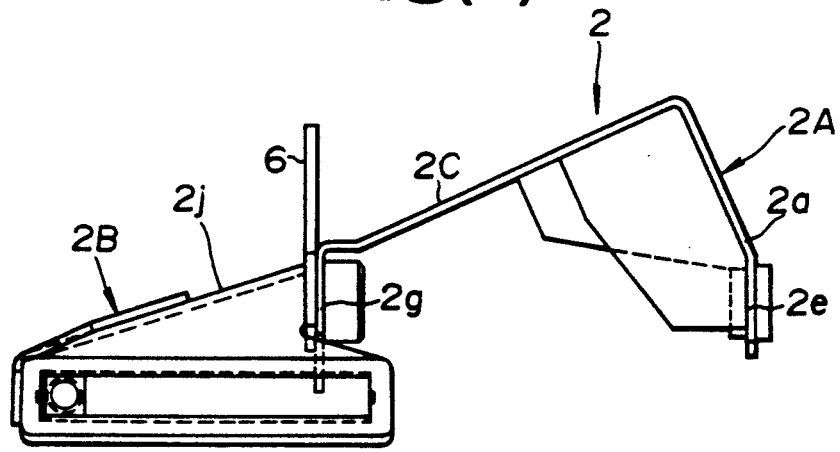
FIG. 8 (A) is a right side view showing a stationary bracket illustrated in FIG. 1.
Figure 8B:
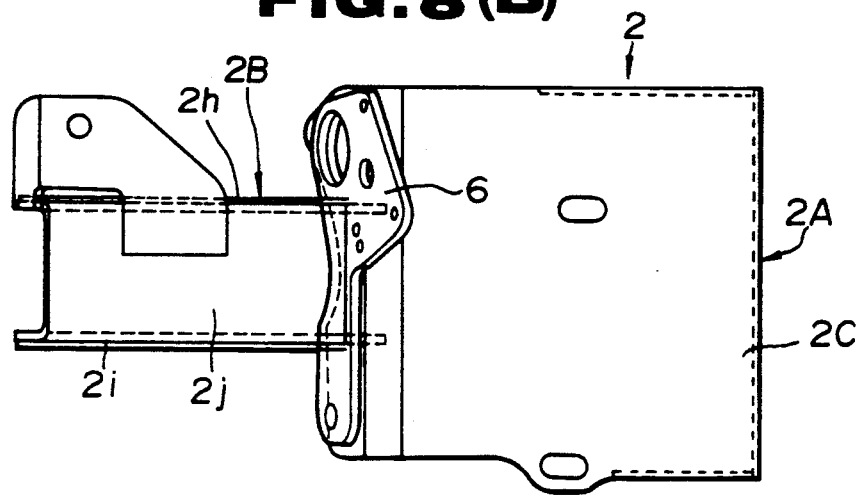
Figure 8C:
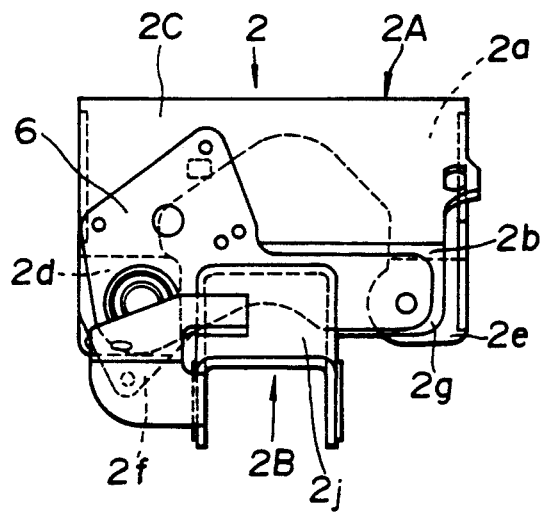

In FIGS. 1 and 2, a stationary bracket 2 having a shape as illustrated in FIGS. 8(A), 8(B) and 8(C) is fixed to a dash board 4. The stationary bracket 2 includes a rear section 2A and a front section 2B. The rear and front sections 2A and 2B are firmly joined through an auxiliary bracket member 6. The rear section 2A includes a rear wall 2a, a front wall 2b and an upper slant wall 2c connecting the rear and front walls 2a and 2b. The rear wall 2a includes a pair of downward projecting portions 2d and 2e, and the front wall 2b includes a pair of downward projecting portions 2f and 2g. The front section 2B includes a pair of side walls 2h and 2i and an upper slant wall 2j connecting the side walls 2h and 2i. In FIGS. 1 and 2, a steering column 8 is arranged through the stationary bracket 2 such that the steering column 8 extends through space defined between the downward projecting portions 2d and 2e, and between the downward projecting portions 2f and 2g, and between the side walls 2h and 2i. A steering shaft 10 is rotatably received in the steering column 8 through bearings (not shown) provided at upper (rear) and lower (front) ends of the steering column 8. The steering shaft 10 is joined to a steering wheel (not shown) at its rear end and is drivingly connected at its front end to an intermediate shaft 12 through a universal joint 14. As shown in FIG. 2, the intermediate shaft 12 includes an inner shaft 12a and an outer sleeve 12b which receives the inner shaft 12a therein. The inner shaft 12a is connected to the universal joint 14 at its rear end, and the outer sleeve 12b extends through a boots mounting member 16 which is fitted into an opening formed in a dash board 18, and is connected at its front end to a gear box (not shown) through a universal joint 20. The inner shaft 12a and the outer sleeve 12b are mutually joined through a spline connection therebetween in such a fashion as to ensure the torque transmission from the inner shaft 12a to the outer sleeve 12b and to allow the inner shaft 12a to move relative to the outer sleeve 12b in a direction along an axis of the outer sleeve 12b.

Figure 4:
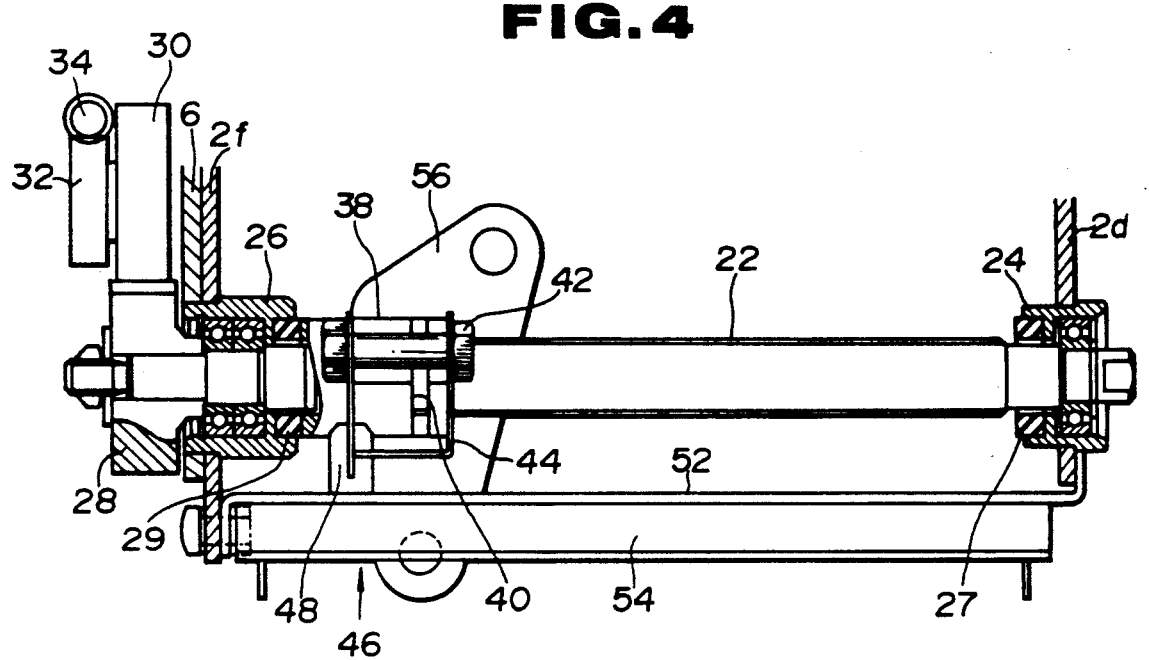
FIG. 4 is a partial cross sectional view taken along line C—C in FIG. 3 and showing main portions thereof.

In FIGS. 2 and 4, a screw rod 22 extends between the downward projecting portions 2d and 2f and further through the bracket member 6. The screw rod 22 is rotatably arranged through respective bearings 24 and 26. The screw rod 22 extends in a horizontal direction along a longitudinal axis of the vehicle. A gear 28 is fixedly mounted on a front end portion of the screw rod 22. The gear 28 meshes with another gear 30 which is integrally formed with a worm gear 32. The worm gear 32 further meshes with a worm 34 serving as an output shaft of an electric motor of a motor unit 36 which is fixed to the bracket member 6.

A nut member 38 is mounted on the screw rod 22 with helical teeth formed on an outer periphery of the screw rod 22 meshing with corresponding helical teeth formed on an inner periphery of the nut member 38. The helical teeth connection between the screw rod 22 and the nut member 38 is designed to allow the nut member 38 to move along the screw rod 22 when the screw rod 22 is rotated by means of the motor unit 36 through the gear connections among the worm 34 and gears 32, 30 and 28. Elastic stopper members 27 and 29 made of, such as rubber, are fixed to the respective bearings 24 and 26 for allowing the former to work as stoppers for the nut member 38. The nut member is formed with a slit 40 which is compressed by a fastening bolt 42 so as to eliminate looseness between the screw rod 22 and the nut member 38. A sensor bracket 44 is further fixed to the nut member 38 by means of the fastening bolt 42. The sensor bracket 44 cooperates with a displacement magnitude sensor, such as a potentiometer 46, to measure a displacement amount of the nut member 38. Specifically, the sensor bracket 44 is fixed to a sensor lever 48 serving as a movable contact of the potentiometer 46. The sensor lever 48 is guided in an elongate hole 50 (FIG. 5) which extends in parallel to the screw rod 22 and is formed in an elongate guide member 52. The elongate member 52 is fixedly provided between the downward projecting portions 2d and 2f and also extends in parallel to the screw rod 22. A main body 54 of the potentiometer 46 is fixed to the elongate guide member 52 and extends in parallel to the screw rod 22 substantially over the full length of the elongate guide member 52. Accordingly, by connecting the potentiometer 46 to a proper circuit (not shown), the displacement amount of the nut member 38 can be measured.

Figure 5:
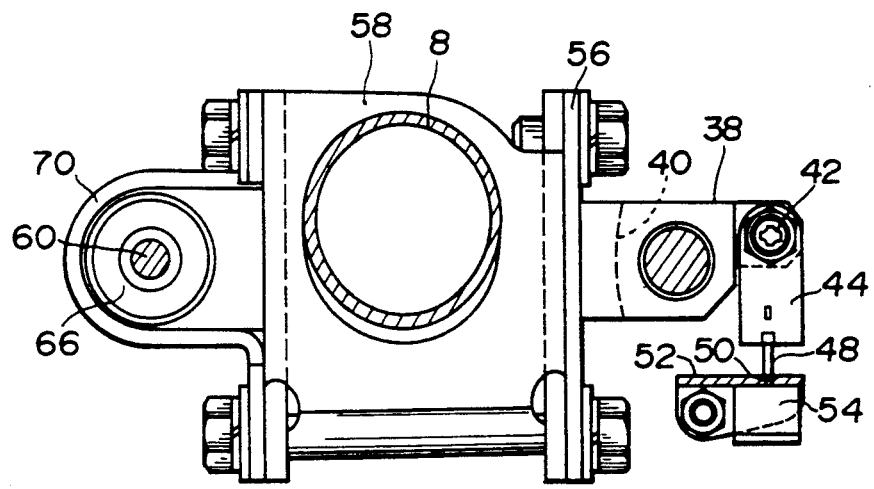
FIG. 5 is a cross sectional view taken along line A—A in FIG. 1 and showing main portions thereof.

As shown in FIG. 5, the nut member 38 is fixed to a bracket 56 which is, in turn, fixed to one side of a clamping member 58 by means of bolts. The clamping member 58 firmly holds the steering column 8 at its intermediate portion.

Figure 6:
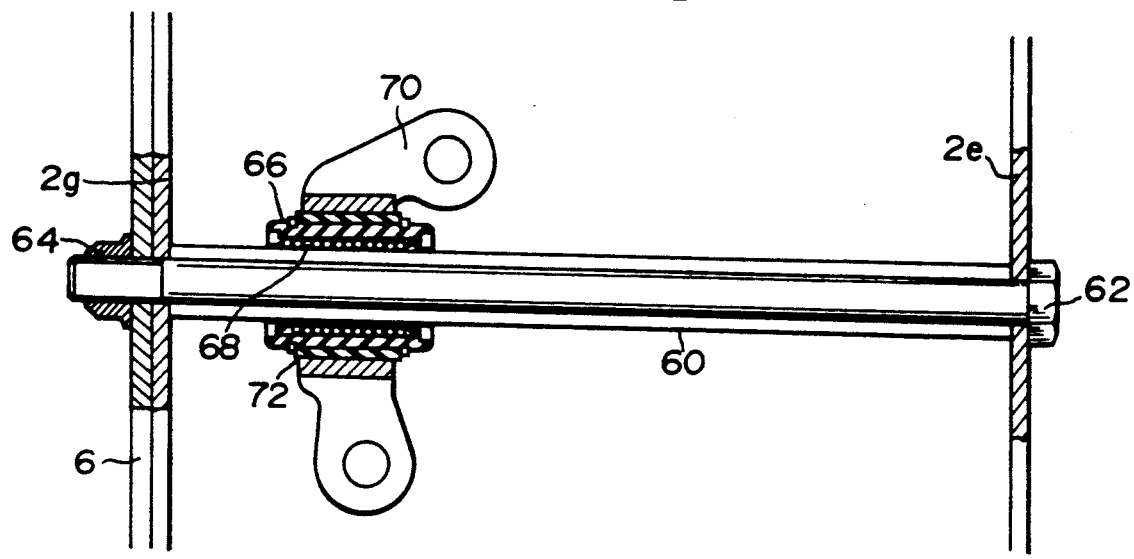
FIG. 6 is a partial cross sectional view taken along line D—D in FIG. 3 and showing main portions thereof.

As shown in FIGS. 1 and 6, a slide rod 60 extends in parallel to the screw rod 22 between the downward projecting portions 2e and 2g and further through the bracket member 6. The slide rod 60 is fixed to the downward projecting portion 2e and the bracket member 6 by means of nuts 62 and 64 which are screwed onto respective threaded end portions of the slide rod 60. A cylindrical mover 66 is mounted on the slide rod 60 and is movable along the slide rod 60 through a plurality of rolling balls 68 which are arranged between the mover 66 and the slide rod 60. The mover 66 is fixed to a bracket 70 through an elastic cover member 72, and the bracket 70 is, in turn, fixed to the other side of the clamping member 58 by means of bolts as shown in FIG. 5.

Figure 7:
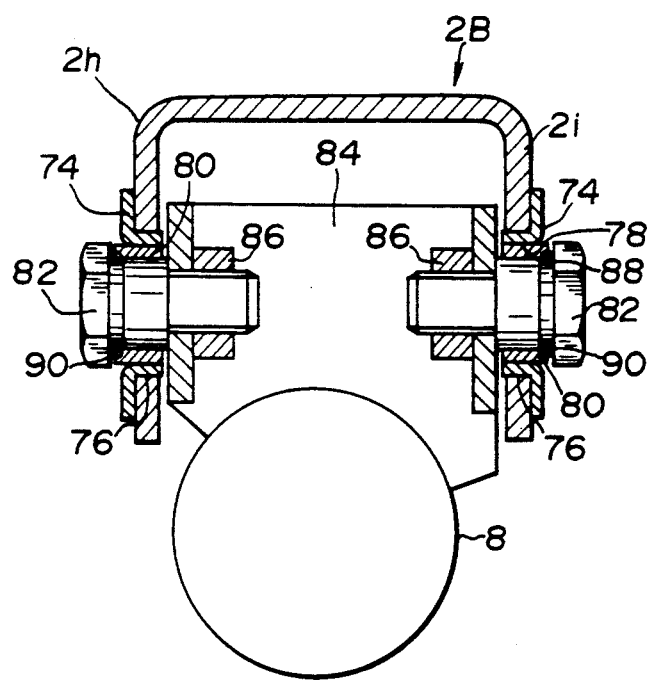
FIG. 7 is a cross sectional view taken along line B—B in FIG. 1 and showing main portions thereof.

Further, as shown in FIGS. 1 to 3 and 7, elongate guide members 74, 74 are fixedly fitted into respective elongate mounting openings 76 formed through the side walls 2h and 2i. Each elongate guide member 74 is formed with an elongate opening 78 which extends in parallel to the screw rod 22. A slider 80 is slidably fitted into each elongate opening 78 for sliding movement along the elongate opening 78. The slider 80 has a central circular opening into which a bolt 82 passes through. The bolt 82 is further screwed into a bracket 84 with a corresponding nut 86 being screwed onto a threaded end of the bolt 82 so as to firmly connect the slider 80 to the bracket 84. The bracket 84 is firmly joined with a front end portion of the steering column 8. As shown in FIG. 7, the slider 80 is formed with an annular recessed portion 88 on its inner periphery at its outer end facing a head of the bolt 82 for accommodating an O-ring 90 between the slider 80 and the bolt head. The O-ring 90 is made of elastic material to apply an axial force to the slider 80 to eliminate looseness between the slider 80 and the bolt 82.

In FIGS. 1 and 2, the electric motor of the motor unit 36 is operated by a switch unit provided on a bracket 92 which is fixed to a rear end portion of the steering column 8.

Now, the operation of the preferred embodiment as described above will be described hereinbelow.

Figure 9:
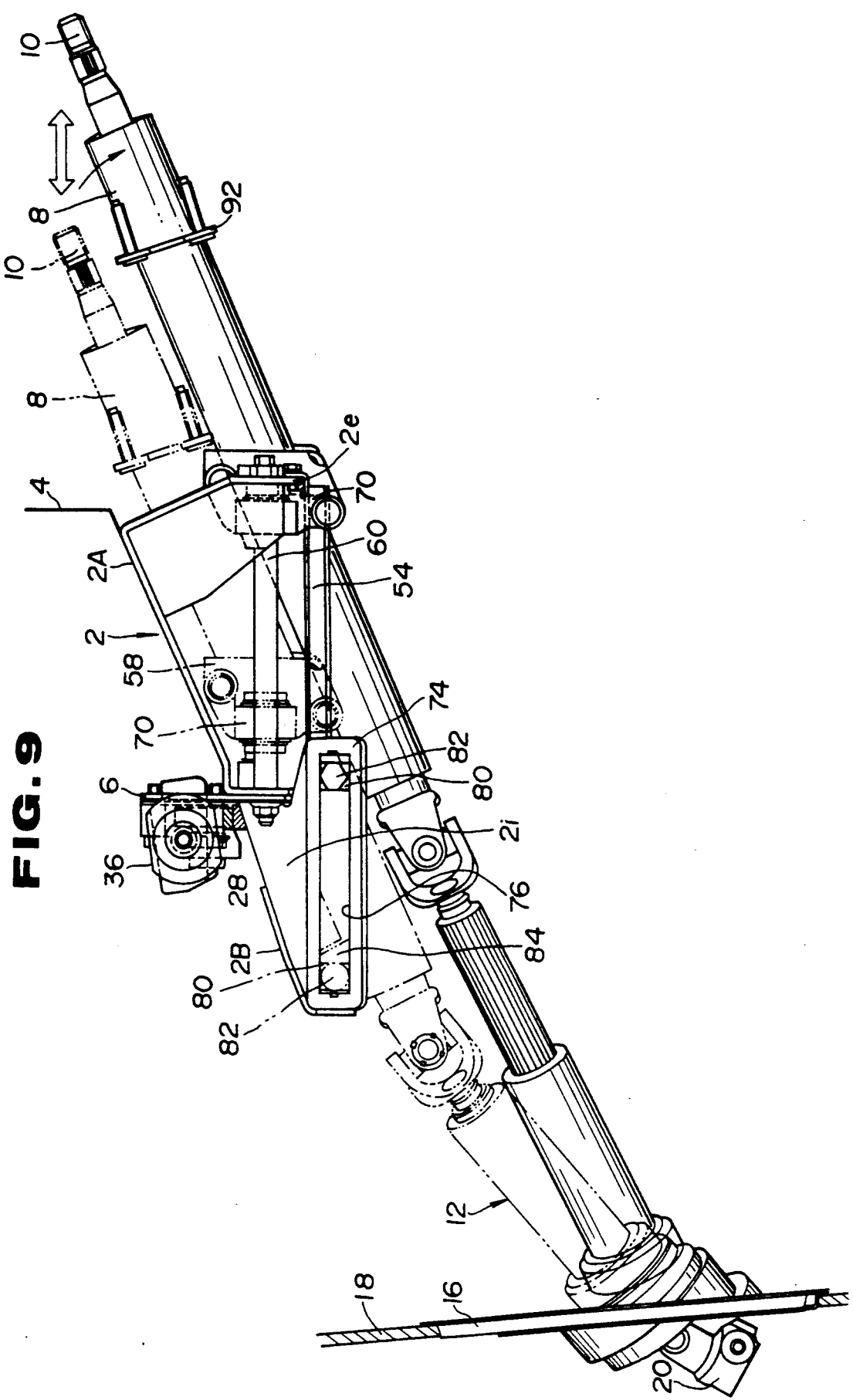
FIG. 9 is a right side view showing the steering column assembly of FIG. 1, wherein a positional adjustment of a steering column according to the preferred embodiment of the present invention is explanatorily illustrated.

When the switch unit is operated by the driver to rotate the electric motor in a normal direction, the screw rod 22 is rotated in the normal direction through the gear train of the worm 34, the worm gear 32 and the gears 30 and 28. Accordingly, the nut member 38 starts to move along the screw rod 22 rearward or toward the driver (rightward in FIG. 4). Since the nut member 38 is fixed to the bracket 56 which, in turn, is fixed to the clamping member 58 firmly holding the steering column 8, the steering column 8 is urged rearward or toward the driver to pull out the inner shaft 12a from the outer sleeve 12b through the steering shaft 10 and the universal joint 14. Simultaneously, the universal joints 14 and 20 cooperatively work to vary an angle of the intermediate shaft 12 relative to the steering column 8. Accordingly, the steering column 8 is allowed to move horizontally rearward, drawn by the clamping member 58, as shown in FIG. 9. A displacement amount of the nut member 38, that is, a displacement amount of the steering column 8, is measured by the potentiometer 46 as described before.

Simultaneously, the mover 66 moves along the slide rod 60 rearward (rightward in FIG. 6), drawn by the clamping member 58 through the bracket 70 to which the mover 66 is fixed. It is to be appreciated that even when there is an assembling error to deteriorate the smooth connection between the mover 66 and the slide rod 60, this is effectively absorbed by the elastic connection between the mover 66 and the bracket 70 by means of the elastic cover member 72.

Further, the sliders 80, 80 simultaneously move along the corresponding elongate openings 78, 78 horizontally rearward, guided by the bracket 84 which is fixed to the front end portion of the steering column 8.

When the switch unit is operated to deenergize the electric motor, the screw rod 22 stops its rotation so that the nut member 38 is stopped instantly to fix the steering column 8 at a desired location.

On the other hand, when the switch unit is operated to rotate the electric motor in a reverse direction, the steering column 8 moves horizontally forward, i.e. away from the driver through the operation of the associated members as described above.

As appreciated, in the preferred embodiments as described above, a horizontal position adjustment of the steering column 8 in the direction along the longitudinal axis of the vehicle can be smoothly performed without changing a vertical level of the steering wheel. Naturally, a magnitude of the horizontal displacement of the steering column 8 is defined by length of the screw rod 22, the slide rod 60 and the elongate openings 78, 78 which are set substantially the same to one another in the foregoing preferred embodiment.

An output of the potentiometer 46 may be input to a microcomputer to store optimum steering column positions for a plurality of drivers in advance so that the optimum steering column position is automatically selected for the particular driver.

Further, in place of the electrical control for the steering column 8, manual control may be provided. Specifically, a rear extension may be provided at the rear end of the screw rod 22 in FIG. 4, and an operating crank or wheel may be provided onto the rear extension. By rotating the operating crank or wheel manually to rotate the screw rod 22, the nut member 38 is displaced along the screw rod 22 as in the foregoing preferred embodiment.

Still further, it may be possible to replace the screw rod 22, the nut member 38 and the associated members with the elongate guide member 74, the slider 80 and the associated members, or it may be possible to further replace the slide rod 60, the mover 66 and the associated members with the elongate guide member 74, the slider 80 and the associated members. In these cases, a positional adjustment of the steering column 8 is performed by simply pulling or pushing the steering wheel or the steering column manually with a proper locking mechanism for locking the steering column at a desired position.

It is to be understood that the invention is not to be limited to the embodiments described above, and that various changes and modifications may be made without departing from the spirit and scope of the invention as defined in the appended claims.

What is claimed is:

1. A steering column assembly for a vehicle, said vehicle having a longitudinal axis extending between forward and rearward ends of the vehicle, said steering column assembly comprising:

a steering column;

stationary bracket means fixed to a vehicle body;

first means, provided between said steering column and said stationary bracket means, for supporting the steering column relative to the stationary bracket means;

said first means adapted to allow said steering column to displace horizontally in a direction along said longitudinal axis, wherein said first means includes a portion of said stationary bracket means, said portion having an elongate opening which extends horizontally in said direction, and a slider slidably fitted into said elongate opening for sliding movement along said elongate opening, said slider connected to said steering column in such a manner as to move along said elongate opening with said steering column;

joint means, provided forward of said steering column, for allowing variation of an angle between said steering column and an associated member, said angle variation caused by said horizontal displacement of the steering column;

second means, associated with said steering column, for allowing variation of a distance between said steering column and the associated member, said distance variation caused by said horizontal displacement of the steering column;

wherein said first means includes a first rod fixed to said stationary bracket and extending horizontally in said direction, said first rod having threads on its outer periphery, and a corresponding nut member mounted on said first rod with corresponding threads meshing with the threads of said first rod such that said nut member moves along said first rod when said first rod is rotated, said nut member being fixed to said steering column; and further comprising a potentiometer fixed to said stationary bracket and arranged along said first rod, said potentiometer having a movable contact which is fixed to said nut member.

2. A steering column assembly as set forth in claim 1, wherein said first rod is arranged at one lateral side of the steering column, and wherein said first means further includes a second rod which is fixed to said stationary bracket means at the other lateral side of the steering column and extends horizontally in said direction, and a movable member movably mounted on said second rod, said movable member fixed to said steering column for moving along said second rod with said steering column.

3. A steering column assembly as set forth in claim 1, wherein said first rod is rotated by an electric motor through a gear train.

4. A steering column assembly as set forth in claim 1, wherein said movable contact moves along an elongate guide member which is fixed to said stationary bracket and extends in parallel to said fixed rod.

5. A steering column assembly for a vehicle, said vehicle having a longitudinal axis extending between forward and rearward ends of the vehicle, said steering column assembly comprising:

a steering column;

stationary bracket means fixed to a vehicle body;

first means, provided between said steering column and said stationary bracket means, for supporting the steering column relative to the stationary bracket means;

said first means adapted to allow said steering column to displace horizontally in a direction along said longitudinal axis;

a first joint, provided forward of said steering column, for allowing pivotable movement of said steering column;

a second joint provided forward of said first joint;

shaft means connecting said first and second joints for pivotable movement therebetween;

said shaft means adapted to extend when said steering column moves horizontally rearward and to contract when said steering column moves horizontally forward;

wherein said first means includes a pair of elongate openings formed at both lateral sides of said stationary bracket means in corresponding lateral locations to each other, each elongate opening extending horizontally in said direction, and a pair of sliders each slidably fitted into said elongate opening for sliding movement along said elongate opening, said sliders connected to said steering column through a first bracket in such a manner as to move along said elongate opening with said steering column; and wherein said first means further includes a first rod which is fixed to said stationary bracket at its one lateral side and extends horizontally in said direction, and a movable member movably mounted on said first rod, said movable member fixed to said steering column through a second bracket for moving along said first rod with said steering column whereby said sliders and said movable member respectively allow said steering column to displace horizontally in said direction, while, supporting the steering column relative to the stationary bracket means.

6. A steering column assembly as set forth in claim 5, wherein said shaft means includes an outer sleeve and an inner shaft telescopically received in said outer sleeve, said inner shaft connected to said first joint at its rearward end and said outer sleeve connected to said second joint at its forward end, said inner shaft and said outer sleeve being connected to allow said inner shaft to displace along an axis of said outer sleeve in response to said horizontal displacement of said steering column.

7. A steering column assembly as set forth in claim 6, wherein said inner shaft and said outer sleeve are connected by means of a spline which allows a torque transmission from said inner shaft to said outer sleeve and further allows said inner shaft to displace along the axis of said outer sleeve in response to said horizontal displacement of said steering column.

8. A steering column assembly as set forth in claim 5, wherein said first rod is arranged rearward of said elongate openings.

9. A steering column assembly as set forth in claim 5, wherein said first means includes a second rod fixed to said stationary bracket at its other lateral side and extending horizontally in said direction, said second rod arranged in a location laterally corresponding to said first rod and having threads on its outer periphery, and a corresponding nut member mounted on said second rod with corresponding threads meshing with the threads of said second rod such that said nut member moves along said second rod when said second rod is rotated, said nut member being fixed to said steering column through said second bracket.

10. A steering column assembly as set forth in claim 9, wherein said second rod is rotated by an electric motor through a gear train.

11. A steering column assembly as set forth in claim 10, which further comprises a potentiometer fixed to said stationary bracket means at said other lateral side and arranged along said second rod, said potentiometer having a movable contact which is fixed to said nut member.

12. A steering column assembly as set forth in claim 11, wherein said movable contact moves along an elongate guide member which is fixed to said stationary bracket means and extends in parallel to said second rod.

13. A steering column assembly for a vehicle, said vehicle having a longitudinal axis extending between forward and rearward ends of the vehicle, said steering column assembly comprising:

a steering column;

stationary bracket means fixed to a vehicle body;

said stationary bracket means having an elongate opening which extends horizontally in a direction along said longitudinal axis;

a slider slidably fitted into said elongate opening for sliding movement along the elongate opening, said slider connected to the steering column in such a manner as to move along the elongate opening with the steering column;

a first rod fixed to the stationary bracket means and extending horizontally in said direction;

a movable member movably mounted on said first rod and fixed to the steering column for moving along said first rod with the steering column;

a first joint, provided forward of said steering column, for allowing pivotable movement of the steering column;

a second joint provided forward of said first joint;

shaft means connecting said first and second joints for pivotable movement therebetween, said shaft means adapted to extend and contract along its longitudinal axis;

whereby said slider and said movable member respectively allow said steering column to displace horizontally in said direction, while, supporting the steering column relative to the stationary bracket means.

14. A steering column assembly as set forth in claim 13, wherein said first rod is arranged rearward of said elongate opening.

15. A steering column assembly as set forth in claim 13, wherein said first rod is formed with threads on its outer periphery and said movable member is formed with corresponding threads meshing with the threads of said first rod such that said movable member moves along the first rod when the first rod is rotated.

16. A steering column assembly as set forth in claim 13, wherein said first rod is arranged at one lateral side of the steering column, further comprising a second rod fixed to said stationary bracket means at the other lateral side of the steering column and extending horizontally in said direction, said second rod arranged in a location laterally corresponding to said first rod and having threads on its outer periphery, and a corresponding nut member mounted on said second rod with corresponding threads meshing with the threads of the second rod such that said nut member moves along said second rod when the second rod is rotated, said nut member being fixed to said steering column.

* * * * *